Figure 1:
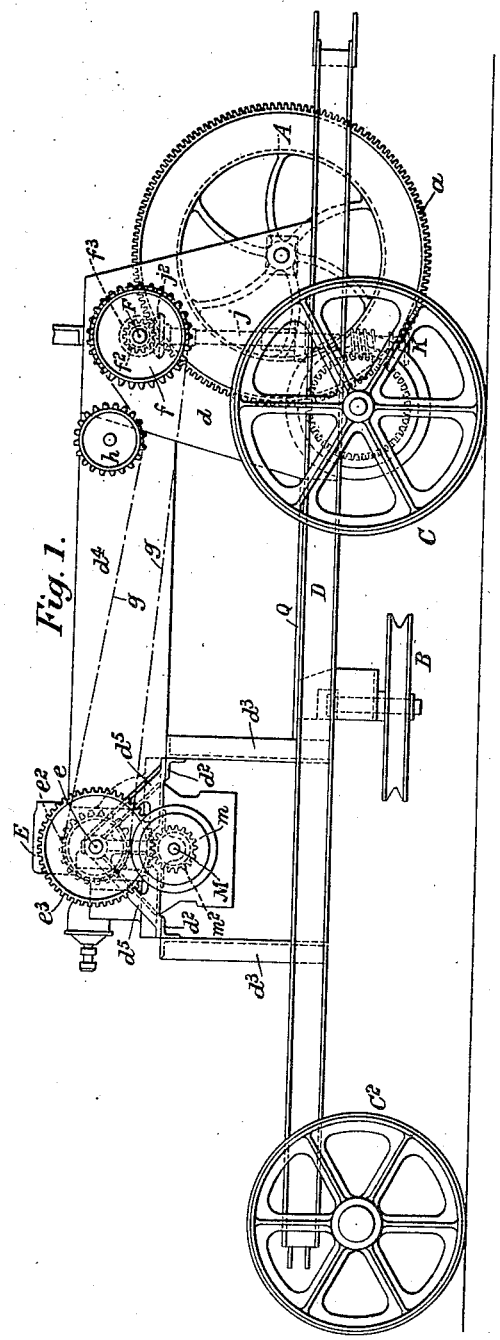

H. McLAREN.
MOTOR WINDLASS.
APPLICATION FILED MAY 10, 1920.

1,434,957.

Patented Nov. 7, 1922.
3 SHEETS—SHEET 1.

INVENTOR
HENRY McLAREN
BY Howson and Howson
ATTORNEYS

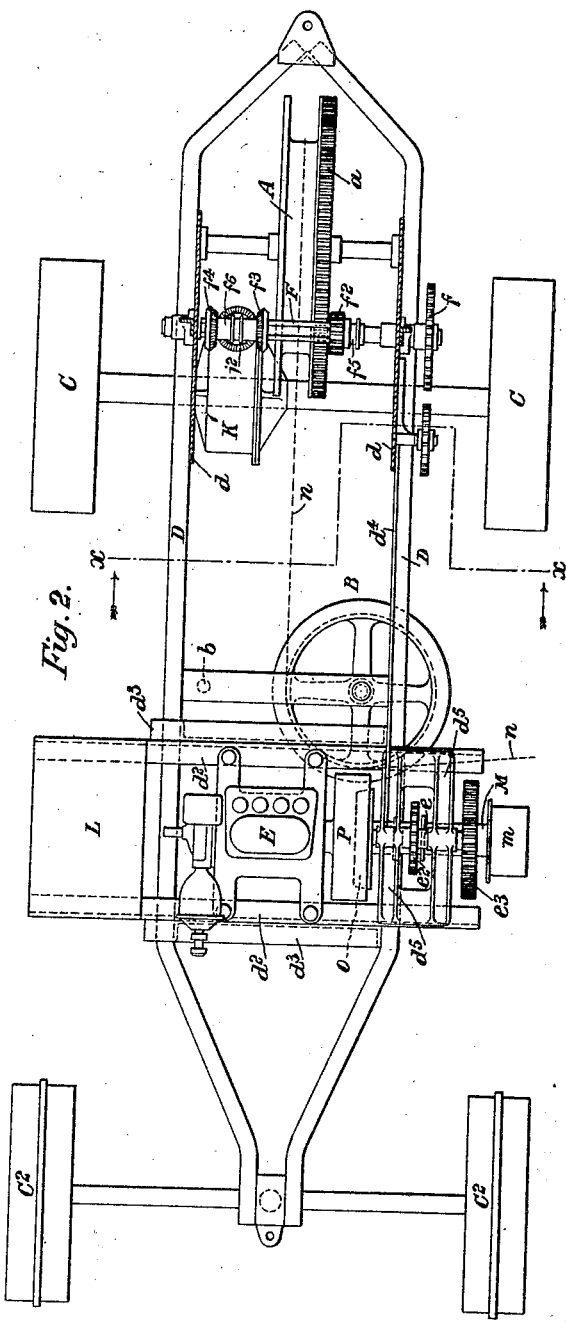

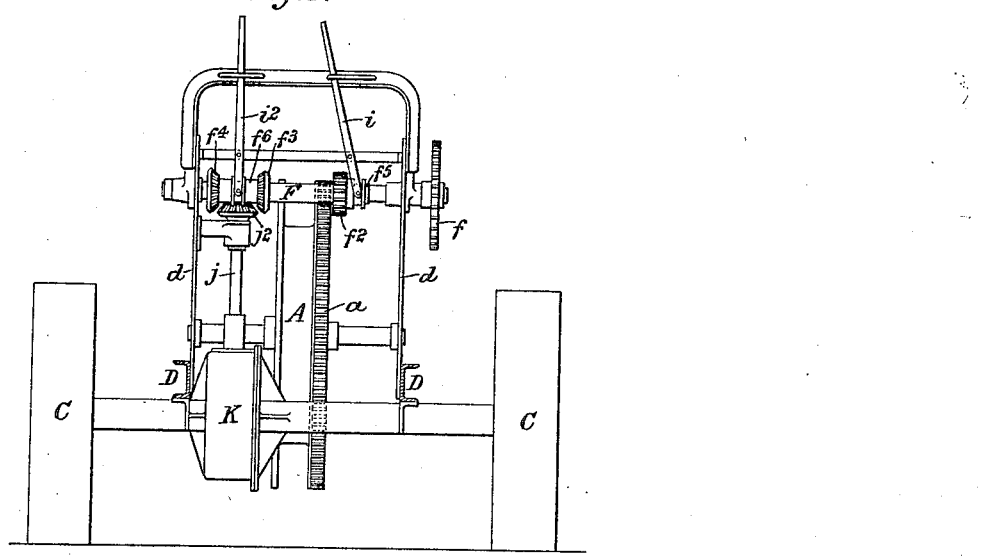

Patented Nov. 7, 1922.

1,434,957

UNITED STATES PATENT OFFICE.

HENRY McLAREN, OF LEEDS, ENGLAND, ASSIGNOR OF ONE-HALF TO J. & H. McLAREN, LIMITED, OF LEEDS, YORK, ENGLAND.

MOTOR WINDLASS.

Application filed May 10, 1920. Serial No. 380,299.

*To all whom it may concern:*

Be it known that I, HENRY McLAREN, a subject of the King of Great Britain, residing at Midland Engine Works, Leeds, in the county of York, England, have invented new and useful Improvements in Connection with Motor Windlass, of which the following is a specification.

The means hitherto employed for mechanical ploughing and cultivating land present various objections which it is the object of my invention to overcome. I will, for the purposes of description, presume that ploughing has to be done, although the arrangements in accordance with this invention may be employed in connection with other cultivation operations.

It has been proposed to employ apparatus consisting of a combination of a windlass, and a motor-engine mounted upon a carriage and provided with gearing by means of which the said engine can be put, as required, either into connection with the driving gear of the carriage for conveying the apparatus from place to place, or into connection with the windlass for operating the plough, or cultivator; but, as far as I am aware, no arrangment on this principle has been provided which has met practical requirements, or been put into operation, and it is the object of my present invention to simplify and improve apparatus upon this principle in such manner that the improved apparatus (constituting what I will refer to as motor-windlasses) is rendered practically available for use by land-owners and farmers generally, two light motor-windlasses in accordance with my invention, one at each headland, being capable of hauling, for example, a simple balance plough in a very satisfactory manner, and being very efficient and economical in work.

The accompanying drawings represent sufficient of a motor-windlass in accordance with my invention to explain in conjunction with the following description, both the nature of this invention and how it may be performed, Figure 1 being a sectional side elevation, Figure 2 a plan, and Figure 3 a vertical section on the line $x\ x$, Figure 2.

In each of my improved motor-windlasses I provide, (in addition to an engine at, or towards, one end of the motor-windlass) a rope-drum A, preferably of small width and mounted outward of the axle of the travelling wheels at the other end of the motor-windlass, so as to be capable of rotating in a vertical plane coincident with, or parallel to, the central longitudinal line of the said motor-windlass. I also provide a pulley B, mounted so as to be capable of rotating in a plane at, or about, right angles to that in which the rope-drum A rotates, which ensures good winding of the rope onto, and off from, the underside of the drum, and does not necessarily require the motor-windlasses to stand either level, or square, with the pull of the ploughs. The run of the rope from the rope-drum A, around the pulley B and thence to the plough, is indicated by the dotted line $n$ in Figure 2. The arrangement, and the small width, of the rope-drum A, obviate the necessity for using any coiling gear in connection with the said drum. The drum A and pulley B should be guarded so that the slack rope will not get over the flanges. The pulley B is placed as near the surface of the land as is practicable, and is kept well to the pulling side of the windlass, (as seen in Figure 2) so that it is impossible for the pull on the rope to upset the motor-windlass and it admits of the rope, when pulling at an angle, approaching the pulley B at a considerable deviation from a right angle with the side of the motor-windlass without coming against the travelling wheels C.

In addition to the hole in which the stud, on which the pulley B rotates, is shewn inserted, another hole is shewn as being provided, at $b$ in Figure 2, so that the position of the pulley B can be readily altered according to whether the motor-windlass is to pull from the right hand side, or from the left hand side thereof.

I prefer that the frame D, of my improved motor-windlasses, shall be as light as possible, and that the rope drum A and travelling gear shall be carried as aforesaid, outward of the travelling-wheel axle at the end of the motor-windlass whereat the said rope-drum is situated. The internal combustion motor E at, or towards, the other end of the motor-windlass, may be of any kind suitable for driving the rope-drum A, by a pitch chain, or other suitable gear. The pulley B is preferably as nearly midway as may be convenient, between the front, or steering, wheels $C^2$, and the back, or travelling, wheel C, of the motor-windlass, as this is the best position for taking the pull of the plough.

The arrangement described gives a good distribution of weight on the travelling wheels and a short wheel-base which facilitates steering the motor windlass round sharp corners.

I do not limit myself to particular details as regards the way the rope-drum, rope-guiding pulley, and engine, are mounted upon the frame, nor as regards the gear by which the motion is conveyed either to the rope-drum, or to the travelling wheels, as required; but the arrangements illustrated in the drawings for these purposes are convenient and, with the other arrangements, constitute an efficient combination. The rope-drum A, is supported and rotates upon a shaft carried by bearings in the side-plates $d$ which also carry bearings for the shaft F. The engine E is supported upon cross-girders $d^2$ secured to uprights $d^3$ and the structure is strengthened by a plate $d^4$ connected at one end with the engine supports and at the other end with one of the side plates $d$.

The shaft M is mounted in bearings carried by the brackets $d^5$ and is provided with a cone-clutch O, a toothed pinion $m^2$, and a belt pulley $m$, which pulley, by means of a belt, can be used for driving from the engine E, farm, or other, machinery. The gear wheels $m^2$ and $e^3$ are fitted on cones on their respective shafts, so that they can be readily removed, and others substituted to meet the difference of purchase required according to the various classes of land. The cone-clutch O engages with a correspondingly recessed wheel P, carried by the crank-shaft of the engine E, and, by means of this clutch, the driving gears can be started, or stopped, as required, without stopping the engine. The countershaft $e$ is supported in bearings carried by the bracket $d^5$, and is fitted with a toothed wheel $e^3$, and a sprocket wheel $e^2$ which sprocket wheel drives the travelling wheels, or the rope-drum, as required, through a chain (indicated by the dot-and-dash lines at $g$ in Figure 1) passing under a jockey-wheel $h$ and over a sprocket-wheel $f$, on the shaft F, which also carries a toothed pinion $f^2$ and a pair of bevel-wheels $f^3$, $f^4$, the said pinion and pair of wheels each being formed with, or secured to, one of two collars (marked $f^5$ and $f^6$ respectively) with which the levers $i$ and $i^2$ (Figure 3) respectively engage.

The collar $f^5$ and pinion $f^2$ and also the collar $f^6$ and pair of bevel-wheels $f^3$, $f^4$, engage the shaft F by a groove and feather connection, so that, by shifting (by means of the lever $i^2$) either of the bevel-wheels ($f^3$, or $f^4$,) into gear with the bevel-wheel $j^2$ on the shaft $j$ the engine E, through an ordinary, or any suitable, drive (indicated at K) will convey motion to the travelling wheels C for traversing the motor-windlass from place to place. By bringing the bevel-wheels $f^3$, $f^4$, into the position, shewn in Figure 3, in which both are disengaged from the wheel $j^2$, no movement will be conveyed to the travelling wheels and then, by operating the lever $i$, the pinion $f^2$ can be brought into gear with the toothed wheel $a$ of the rope-drum A so that the engine E will drive it for ploughing, or other cultivating. L is a platform which may be used for starting purposes, and for carrying a tool box, or the like, and Q, Figure 1, indicates a platform for the engine driver.

An efficient motor-windlass should have a short travelling-wheel-base and as long a distance as possible between the horizontal rope-pulley and the rope-drum to allow the rope to spread and fill the drum from flange to flange without the aid of coiling gear, and also the various parts should be arranged so that the weight of the motor-windlass and the pull of the rope should be divided as nearly equally as is practicable between both axles. By overhanging the drum beyond the axles farthest from the engine I secure all these advantages.

My improved motor-windlasses provide, at a low price, efficient means meeting all requirements in operating ploughs, and other cultivating implements.

What I claim is:

1. An apparatus for use in connection with implements for cultivating land, said apparatus comprising a carriage mounted upon travelling wheels arranged to afford a short wheel-base, an internal combustion engine carried towards one end of the carriage, and a rope drum carried towards the other end of the said carriage and located rearwardly of the axle of the carrying-wheels at the said other end, said rope-drum being capable of rotation in a vertical plane parallel to the central longitudinal line of the carriage, and gear for operatively connecting the engine either to the rope-drum for operating the cultivating implement, or to the travelling wheels for moving the apparatus from place to place, a rope-guiding pulley arranged low down between the axles of the travelling wheels and capable of rotating in a horizontal plane substantially at right angles to the plane of rotation of the rope-drum.

2. An apparatus for use in connection with implements for cultivating land, said apparatus comprising a carriage mounted upon travelling wheels arranged to afford a short wheel-base, an internal combustion engine carried towards one end of the carriage, and a rope drum carried towards the other end of the said carriage and located rearwardly of the axle of the carrying-wheels at the said other end, said rope-drum being capable of rotation in a vertical plane parallel to the central longitudinal line of the carriage, and gear for operatively connecting the engine either to the rope-drum for operating the cultivating implement, or to the travelling wheels for moving the apparatus from place to place, a rope-guiding pulley situated substantially midway between the axles of the travelling wheels, so that the rope can, when pulling at an angle to the length of the carriage, pass from the said pulley to the cultivating implement without interfering with the travelling wheels arranged on a short wheel-base.

3. An apparatus for use in connection with implements for cultivating land, said apparatus comprising a carriage mounted upon travelling wheels arranged to afford a short wheel-base, an internal combustion engine carried towards one end of the carriage, and a rope drum carried towards the other end of the said carriage and located rearwardly of the axle of the carrying-wheels at the said other end, said rope-drum being capable of rotation in a vertical plane parallel to the central longitudinal line of the carriage, and gear for operatively connecting the engine either to the rope-drum for operating the cultivating implement, or to the travelling wheels for moving the apparatus from place to place, a rope-guiding pulley arranged low down between the axles of the travelling wheels, and capable of rotating in a horizontal plane substantially at right angles to the plane of rotation of the rope-drum, together with means for mounting the rope-guiding pulley at the side of the apparatus nearest the cultivating implement.

4. A motor-windlass comprising the combination of a carriage, an internal combustion engine at one end of the carriage, a rope drum of small width at the other end of the carriage and mounted rearwardly of the wheel-axle at that end, a horizontal rope-guiding pulley on the pulling side of the motor-windlass and approximately midway between the front and rear wheel axles and adapted to permit the apparatus to cultivate while substantially at right angles to the line of cultivation implement, and means for driving from the motor either the rope-drum, or the travelling wheels; substantially as hereinbefore explained.

In testimony whereof, I have signed my name to this specification in the presence of two subscribing witnesses.

HENRY McLAREN.

Witnesses:
RHODES K. CALVERT,
HAROLD LISTER.